Jan. 26, 1960 T. A. DEAKINS ET AL 2,922,205
AUTOMATIC WEIGHING AND POURING OF MOLTEN
METAL INTO PAIRS OF FOUNDRY MOLDS
Filed May 7, 1957 7 Sheets-Sheet 4

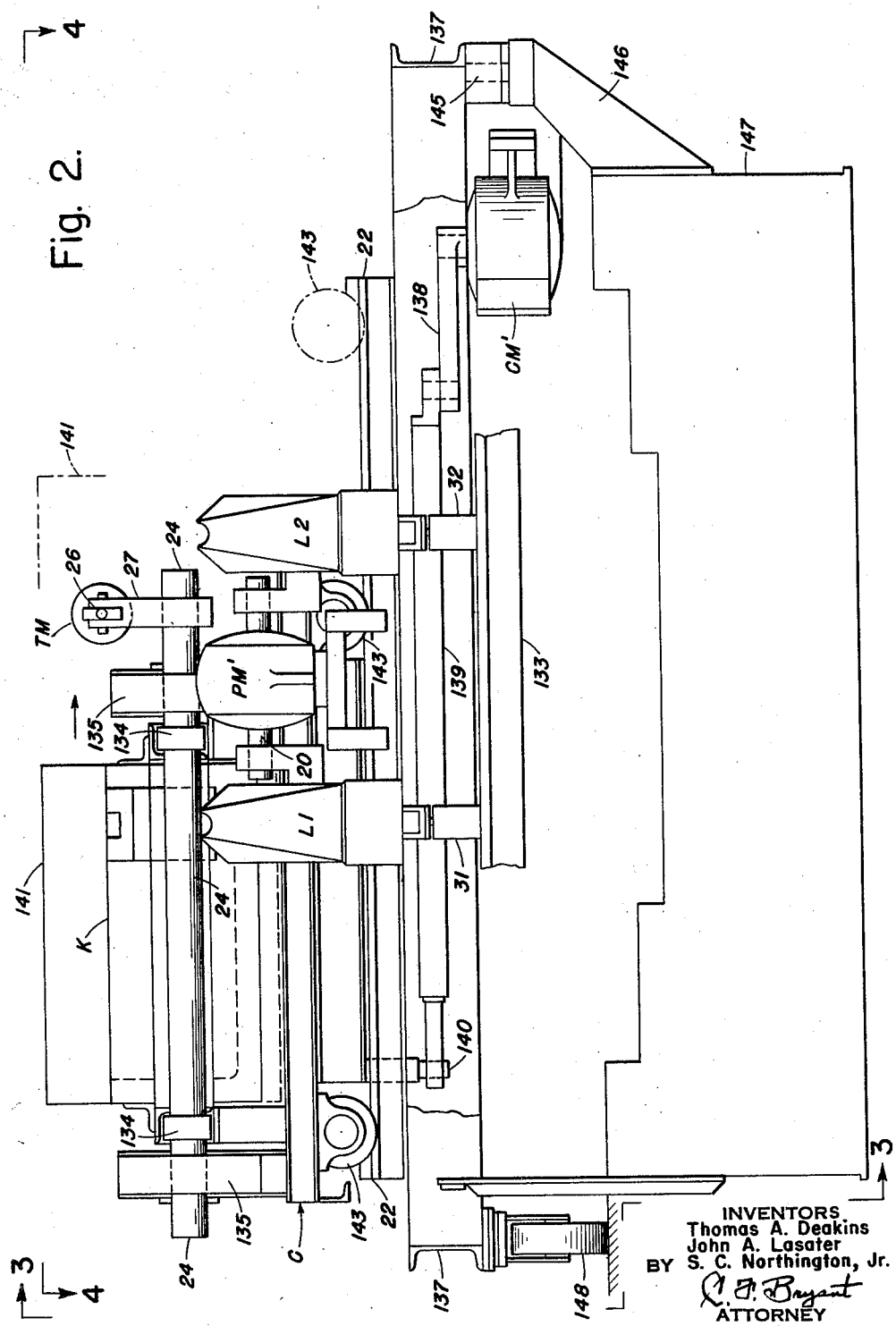

INVENTORS
Thomas A. Deakins
John A. Lasater
BY S. C. Northington, Jr.
ATTORNEY

Jan. 26, 1960

T. A. DEAKINS ET AL 2,922,205

AUTOMATIC WEIGHING AND POURING OF MOLTEN METAL INTO PAIRS OF FOUNDRY MOLDS

Filed May 7, 1957

INVENTORS
Thomas A. Deakins
John A. Lasater
BY S. C. Northington, Jr.

ATTORNEY

United States Patent Office 2,922,205
Patented Jan. 26, 1960

2,922,205
AUTOMATIC WEIGHING AND POURING OF MOLTEN METAL INTO PAIRS OF FOUNDRY MOLDS

Thomas A. Deakins and John A. Lasater, Chattanooga, and Samuel C. Northington, Jr., Lookout Mountain, Tenn., assignors to Combustion Engineering, Inc., New York, N.Y., a corporation of Delaware Application May 7, 1957, Serial No. 657,638

4 Claims. (Cl. 22—82)

Our invention relates to the weighing and pouring of fluids such as molten metal, and it has special reference to new and improved facilities for the automatic weighing and pouring of the molten metal which is utilized for producing castings in a foundry.

Broadly stated, the object of our invention is to better the performance of foundry installations wherein castings are formed via the employment of pairs of said-lined or other molds into which molten iron or other metal is poured in measured quantities.

A more specific object is to cut down the number of operators who are needed to weigh and pour molten metal successively into such pairs of foundry molds.

Another object is to shorten the time that is required to accomplish such weighing and pouring, and also to better the accuracy of the weighing.

A further object is to lower mechanical wear on the moving parts of mold-pair serving systems by reducing cycling movements thereof to a minimum.

Other objects and advantages will become apparent as the disclosure and description hereof proceeds.

Illustrative equipment provided by us for practicing this invention is disclosed by the accompanying drawings wherein:

Figs. 1A and 1B when placed together in side-by-side relationship constitute a diagrammatic showing of apparatus and circuits novelly organized to effect the automatic weighing and pouring of molten metal into foundry molds which are brought to that apparatus in successive pairs;

Fig. 2 is a front elevational view representing one preferred mechanical construction for the holding ladle and traverse car and pouring ladle apparatus of the Figs. 1A—1B system;

Figure 1A:
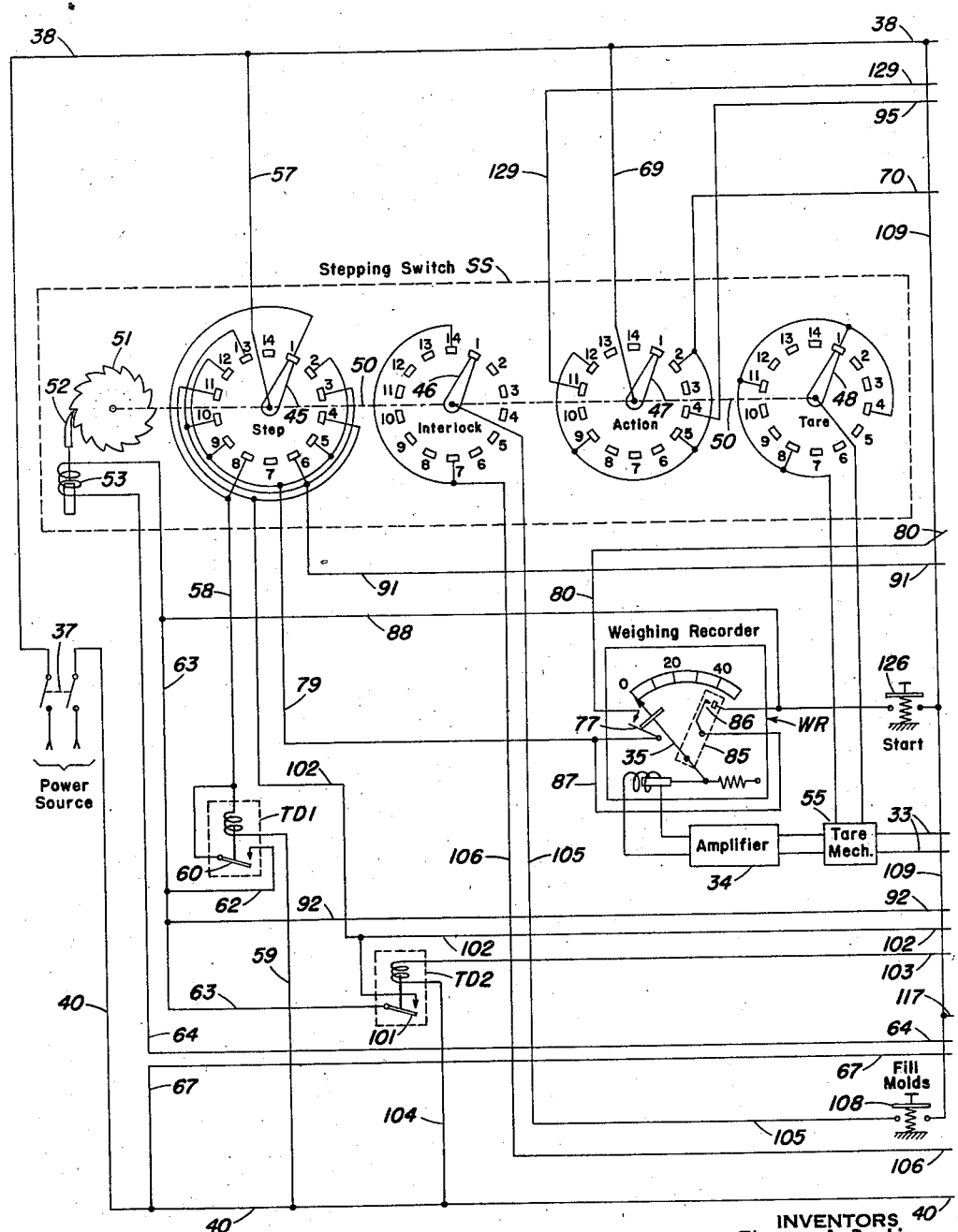
Figure 1B:
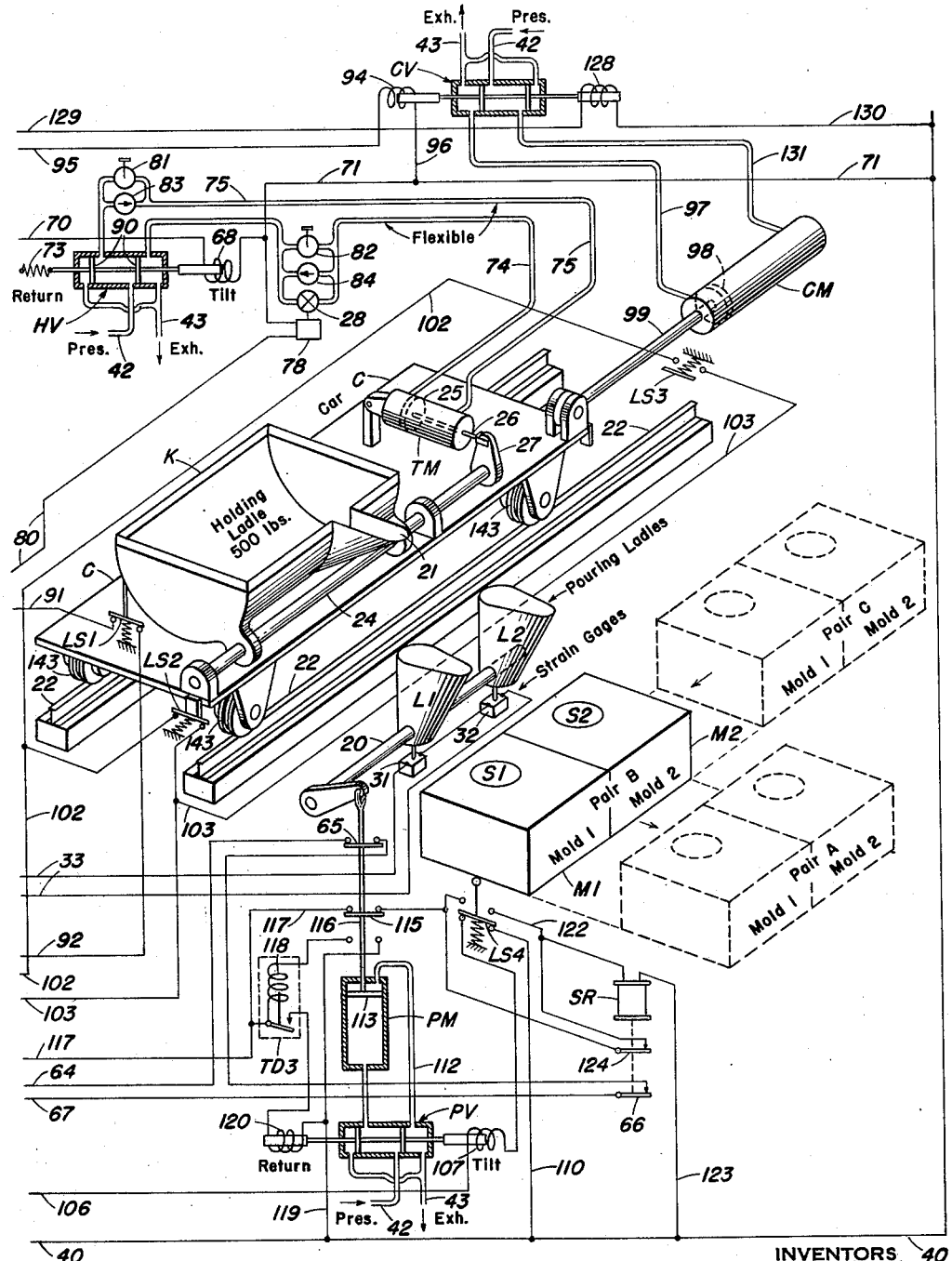
Figure 3:
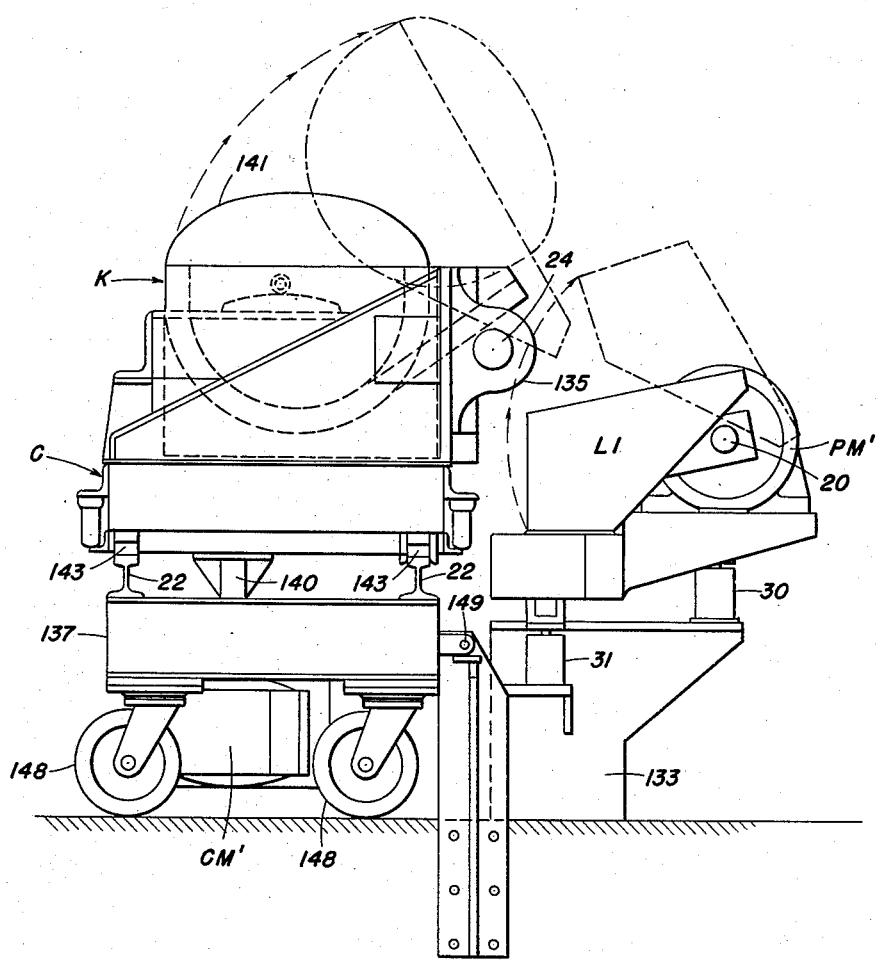
Fig. 3 is a view on line 3—3 of Fig. 2 showing how the same ladle and car apparatus appears when viewed from the end.
Figure 4:
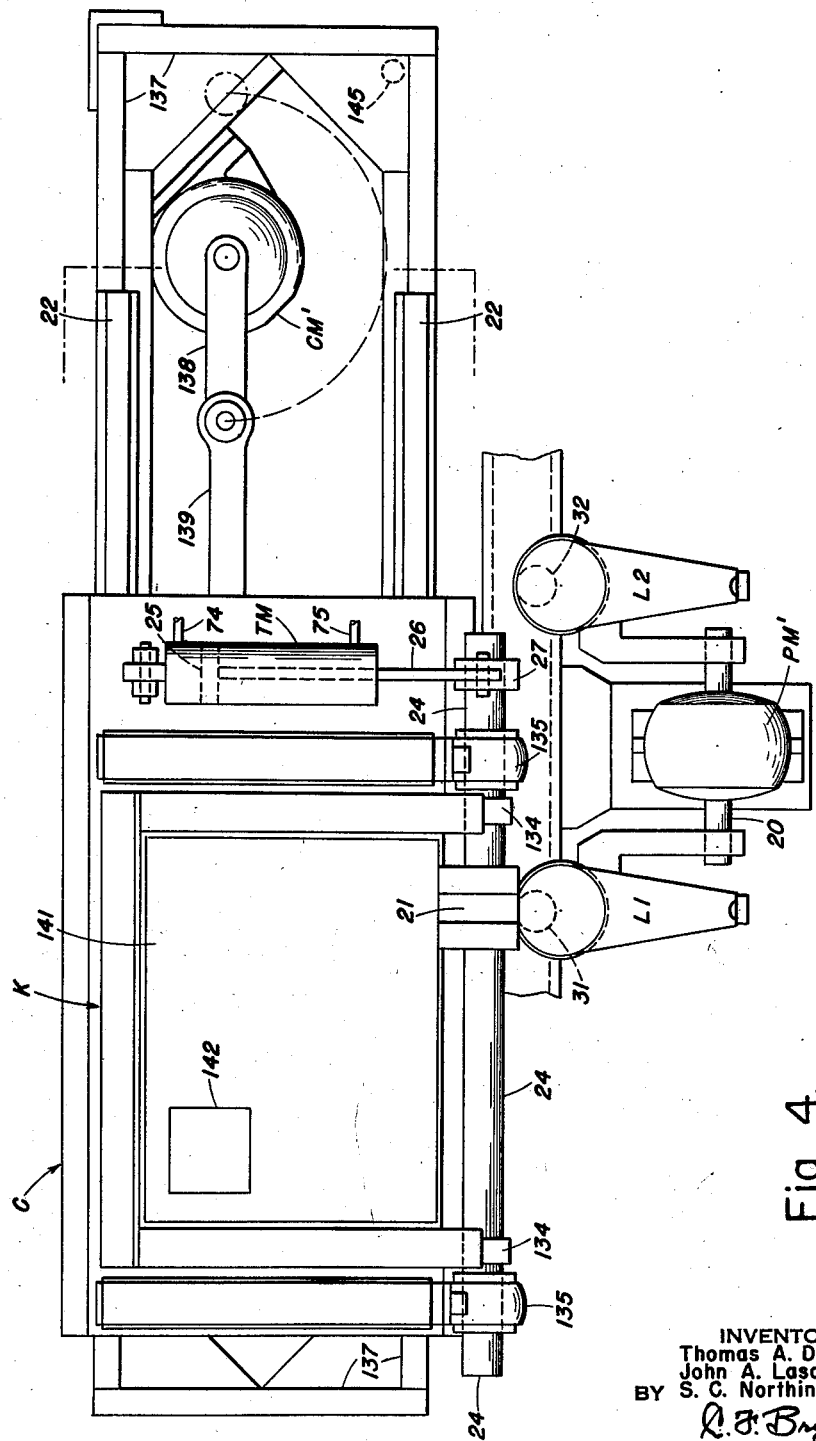
Figure 5A:
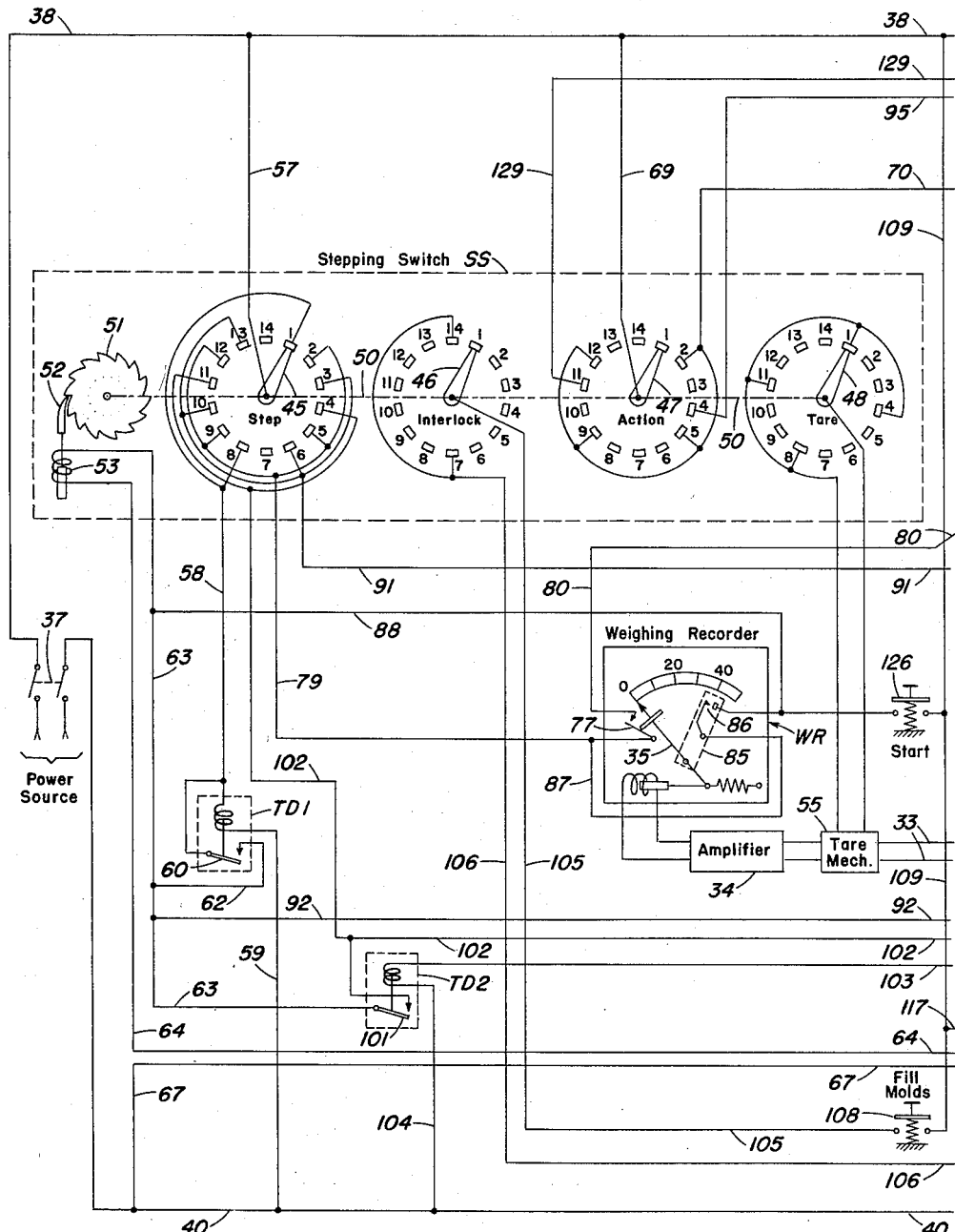
Figure 5B:
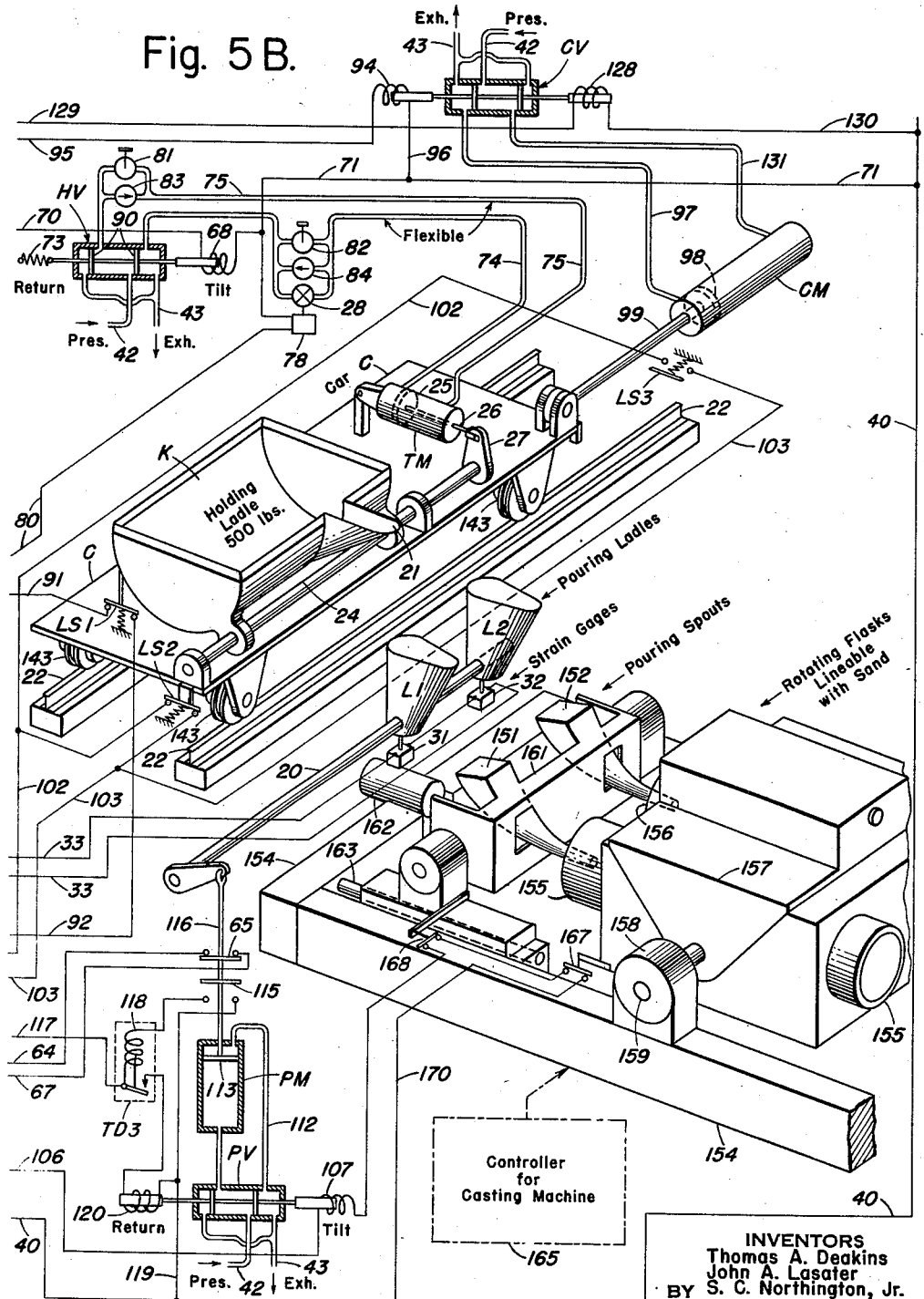

Fig. 4 is a view on line 4—4 of Fig. 2 showing how this apparatus of Figs. 2–3 appears when viewed from the top; and Figs. 5A and 5B when placed together in side-by-side relationship constitute a schematic representation which corresponds to Figs. 1A–1B but which differs therefrom by showing how our two pouring ladles L1 and L2 of the Figs. 1A–1B system can be organized to deliver their accurately weighed charges of molten metal into the two pouring spouts of a foundry machine that is designed to produce successive pairs of pipe lengths by centrifugally casting them in sand-lined mold flasks of the rotatable type.

Referring first to Figs. 1A–1B, we have there diagrammatically shown our new system organized to effect an automatic weighing and pouring of molten metal into the sprue openings S1 and S2 of pairs of molds M1 and M2 which are successively brought in front of two pouring ladles L1 and L2. Those pouring ladles receive measured quantities of the molten metal from a main holding ladle K; they are carried by a common shaft 20 which spaces them by the distance between the mold openings S1 and S2; they normally are held by shaft 20 in the upright positions indicated; but they also can be tilted forwardly, as by a hydraulic motor PM under the control of a valve PV, for the purpose of pouring their measured contents into the molds M1 and M2.

The above mentioned main holding ladle K has a spout 21 and is carried by a car C which is movable from left to right along a pair of rails 22 that are mounted generally parallel to the pouring ladle shaft 20. Under the action of a traversing motor CM (which is controlled by valve CV) this car C can be shifted back and forth along rails 22 from the represented extreme left position, wherein spout 21 of holding ladle K is aligned over the left pouring ladle L1, to the extreme right position wherein spout 21 is aligned over the right pouring ladle L2.

Said holding ladle K is dimensioned to contain a substantial supply, such as 500 pounds, of the molten metal that is to be poured. Such molten metal as drawn from the cupola furnace (not shown) of the foundry installation can of course be delivered to ladle K in any suitable manner. Thus an overhead monorail car (also not shown) can if desired be utilized to refill the ladle K with molten metal at suitable intervals during operation of the new automatic weighing and pouring facilities now being described.

This ladle K normally occupies the level position indicated. However, at proper times forwardly tilting movement is imparted thereto by suitable means here shown as including a shaft 24 plus a cylinder-type hydraulic motor TM having a piston 25 that is linked to ladle shaft 24 via rod 26 and tilting arm 27. This cylinder or motor TM is driven by hydraulic fluid under the control of a valve HV, and it is equipped with speed slowing means (including element 28) selectively effective for a purpose later to be made evident. If desired, tilting motor TM can of course take some other form, such as a rotative type of motor device which imparts rotation to ladle shaft 24 through suitable reduction gearing (not shown).

When car C is in its represented left position, such tilting causes molten metal from holding ladle K to flow via spout 21 into the first pouring ladle L1; and when car C is in the opposite or right position such tilting similarly causes metal to flow via spout 21 into the second pouring ladle L2. Serving to register the weight of the metal so received by ladle L1 is a strain gage 31 mounted therebeneath in the manner shown; and similarly serving to register the weight of metal so poured into ladle L2 is a second strain gage 32.

These two strain gages 31 and 32 respectively carry the weight of ladle L1 plus contents and of ladle L2 plus contents. Each gage has the characteristic of changing its electrical resistance with changes in the weight which it supports, and of in this way generating an electrical signal from which an indication of the supported physical weight can be provided. In the system shown the output of strain gages 31—32 feeds over conductors 33 into an amplifier 34 which strengthens the weight signals and applies them to a weighing recorder WR. This causes pointer 35 of the recorder to indicate the weight of the metal which each of the pouring ladles L1 and L2 receives from the holding ladle K on car C, all in a manner to be more fully described later.

Such weight indications along with other governing influences to be made evident presently feed into electrical and hydraulic control devices for our novelly organized mold-pair serving system. Such devices include a stepping switch SS as well as the instrument WR and the three hydraulic valves PV, CV and HV earlier named. As shown in Figs. 1A–1B, the electrical portions of the system are energized through a switch 37 which when closed connects main supply conductors 38 and 40 with some suitable power source, such as a commercial 110 volt lighting circuit of either the alternating current or the direct current type. In the description which follows it will be assumed that there is in this manner made available between control conductors 38 and 40 a substantially constant electrical potential of about 110 volts.

The earlier mentioned hydraulic valves PV and CV and HV, and the hydraulic motors PM and CM and TM which they respectively control, may be connected with any suitable pressure supply apparatus such as a conventional hydraulic pump (not shown), with the oil or other pressure fluid being fed into the valves via the conduits 42 marked "Pres" and the exhaust fluid being taken away from the valves via the conduits 43 marked "Exh." In the description which follows it will be assumed that these intake and exhaust lines 42 and 43 communicate with an oil pump that keeps lines 42 under some suitable operating pressure such as of about 500 pounds per square inch.

In the illustrative form here shown the control facilities of our new mold-pair serving system coordinate with the aforementioned stepping switch SS of Fig. 1A. It utilizes four wafer assemblages which are marked "Step," "Interlock," "Action" and "Tare" and which respectively include switch arms 45, 46, 47 and 48. These four arms are mounted on a common shaft 50 for simultaneous rotation by a ratchet wheel 51 which can be advanced through fourteen successive steps by a pawl 52 that is activated by a driving solenoid 53. During these fourteen successive steps switch arms 45—46—47—48 of the four wafer assemblages are successively advanced through the fourteen positions which are identified with fourteen contacts of each wafer assemblage. Those fourteen contacts in each assemblage are numbered 1 through 14 in the diagram.

The "Step" assemblage with its switch arm 45 has the primary function of governing, in conjunction with other devices of the system, application of current to stepping solenoid 53 as needed to advance switch SS successively through the fourteen positions during system operation. Such cooperating devices include two time delay relays TD1 and TD2 whose purpose will be made evident presently.

The "Interlock" assemblage with its contact arm 46 ties in with the system in such a way as to permit the two ladles L1 and L2 to pour their measured contents into molds M1 and M2 only when essential preparatory actions have been performed.

The "Action" assemblage with contact arm 47 governs hydraulic valves HV and CV in a way that causes the main holding ladle K to be tilted for pouring into weighing ladle L1 or into weighing ladle L2, and that also causes the ladle car C to be transversed back and forth along rails 22 between a left position identified with ladle L1 and a right position identified with ladle L2. Return of said holding ladle K from each tilting is registered by a limit switch LS1. Advancement of car C into the extreme left position for filling ladle L1 is registered by limit switch LS2; and advancement of car C into the extreme right position for filling ladle L2 is similarly registered by limit switch LS3.

The "Tare" assemblage of stepping switch SS with its contact 48 serves to bring the pointer 35 of weighing recorder WR back to zero at the beginning of each action sequence wherein metal received by pouring ladle L1 is to be weighed and wherein metal received by pouring ladle L2 is to be weighed. In the illustrative arrangement shown use is made of a "tare mechanism" 55 inserted in the strain gage circuit 33 ahead of the amplifier 34. Tare contact 48 activates this mechanism 55 when stepping switch SS is in position 1 and in position 4 and in position 8 and in position 11.

Effect is to cause the WR pointer 35 to stand at zero at the start of each pouring of molten metal into either of the two ladles L1 and L2. Such effect is achieved automatically in manner that being known to those skilled in the instrumentation art will not be explained here. Instead it will suffice to say that in going into each of the stepping switch positions 1 and 4 and 8 and 11 the tare arm 48 causes mechanism 55 to operate in a way which automatically brings pointer 35 of weighing device WR to the zero position in readiness for recording from zero the weight of the molten metal next to be poured into ladle L1 or into ladle L2.

How system of Figs. 1A–1B operates

Attention now will be directed to the manner in which the complete system of Figs. 1A and 1B operates in performing its intended function of dispensing accurately weighed charges of molten metal from holding ladle K into the two pouring ladles L1 and L2 and of thereafter transferring such measured charges of metal from those pouring ladles into the sprue openings S1 and S2 of the pair of molds M1 and M2 that are positioned in front of ladles L1 and L2.

The complete operating cycle consists of fourteen steps respectively identified with the fourteen positions of stepping switch SS; and this operation description will begin with the assumptions that the four switch arms 45—46—47—48 initially are in their first position 1 and that car C is at the left with holding ladle spout 21 aligned over pouring ladle L1.

In the illustrative organization shown such system operation can be initiated by first closing main power switch 37. This action follows an earlier filling of a supply of molten metal into the main holding ladle K.

In this first Step 1 position of stepping switch SS the tare arm 48 activates mechanism 55 and causes WR pointer 35 to read zero with the two pouring ladles L1 and L2 both empty. Step arm 45 now energizes time delay relay TD1 by connecting the winding thereof between supply conductor 38 and 40 over a circuit which includes conductor 57, arm 45 and step contact 1, conductor 58 and conductor 59. After a short interval during which device 55 completes its aforementioned taring function, relay TD1 picks up contact 60 and thereby connects stepping solenoid 53 across supply conductors 38 and 40. The circuit here established includes conductor 57, step switch arm 45 and contact 1, conductor 58, TD1 contact 60, conductors 62 and 63, the solenoid winding 53, conductor 64, a closed contact 65 at pouring ladles L1—L2, closed contact 66 of a stick relay SR, and conductor 67.

Stepping solenoid 53 now moves pawl 52 upwardly causing ratchet wheel 51 to advance all four switch arms 45 through 48 by one step to their respective contacts 2 in the four wafer assemblages. In so advancing step arm 45 breaks the circuit for relay TD1 and thereby de-energizes stepping solenoid 53.

In this Step 2 position of stepping switch SS, action arm 47 initiates the tilting of holding ladle K. This is done via connection of valve HV winding 68 across supply conductors 38 and 40 over a circuit that includes conductor 69, switch arm 47 and contact 2, conductor 70, the winding 68 and conductor 71. Valve HV, whose pistons 90 normally are held in the "tilt-return" position by spring 73, now is shifted by winding 68 to the opposite or right position wherein pressure fluid from conduit 42 flows through conduit 74 into the left end of tilting cylinder TM.

Such fluid flow causes cylinder TM to move piston 25 to the right and thereby tilt (through rod 26 and arm 27) the main holding ladle K upwardly and forwardly around car shaft 24. This piston movement forces fluid from the right end of cylinder TM through return conduit 75 back to valve HV and thence into the exhaust conduit 42. Included in said conduit 75 is a check valve 83 which passes fluid only into the left-to-right direction shown by the small arrow, plus a throttling valve 81 capable of passing fluid in either direction at some reduced rate. Such throttling is adjusted at valve 81 so that piston 25 of tilting cylinder TM can be advanced from left to right only at an "intermediate" speed. Cylinder TM accordingly tilts holding ladle K out of its level position at a speed which initially is intermediate and which so continues until molten metal first starts to pour from spout 21 into the pouring ladle L1 therebeneath.

Such received metal is registered by strain gage 31 which causes weighing recorder WR to move pointer 35 to the right away from zero; and that movement closes contact 77 to complete for the winding 78 of a normally open valve 28 (disposed in fluid conduit 74 in the manner shown) an energizing circuit which closes said valve 28. Such circuit includes step switch arm 45 and contact 2, conductor 79, the speed-slowing contacts 77 in WR, conductor 80, the speed-slowing winding 78 and conductor 71. This now closed valve 28 blocks all fluid flow therethrough and requires that the driving fluid received by tilting cylinder TM from valve HV pass through a parallel throttling valve 82. Said throttling valve 82 can be adjusted to slow the speed of tilting motor TM by any amount desired. It is supplemented by a check valve 84 (also in conduit 74) which while capable of passing fluid from right to left in direction shown by small arrow) blocks passage in the opposite direction of from left to right in the diagram and thus does not detract from the motor slowing.

The "slow" tilting of holding ladle K thus effected by cylinder TM continues with accompanying transfer of molten metal into pouring ladle L1 until the latter ladle has received a predetermined weight. To simplify explanation it will be assumed that such weight is 30 pounds; and weighing recorder WR accordingly has had an adjustable element 85 pre-set therein so that pointer 35 will close contacts 86 when such weight of 30 pounds is registered by instrument WR.

Such closure of WR contact 86 completes for stepping solenoid 53 an energizing circuit which includes the previously named step switch arm 45 and contact 2, conductors 79 and 87, the WR contacts 86 and conductor 88. Thus activated solenoid 53 causes pawl 52 to move all four stepping switch arms 45 through 48 from their respective contacts 2 to their respective contacts 3.

In so moving to this Step 3 position, the action arm 47 of stepping switch SS breaks the tilting circuit (including conductor 70) for the valve HV winding 68. This permits spring 73 to return the valve pistons 90 to the left with accompanying stoppage of tilting cylinder TM and a reversal of driving fluid therethrough. Such reversal comes about from the fact that pressure fluid from supply conduit 42 now flows from valve HV to cylinder TM by way of conduit 75 and returns from the cylinder to the valve by way of conduit 74. The direction of this return flow is such that check valves 83 (in conduit 75) and 84 (in conduit 74) both permit the pressure fluid to pass therethrough without restriction and therefore at a "fast" rate.

In consequence cylinder TM now moves piston 25 in the opposite or left direction causing rod 26 and shaft arm 27 to lower holding ladle K back to the level position indicated. Such return is at a "fast" speed throughout the entire range of ladle movement. This is because the aforementioned check valves 83 and 84 both now permit free passage of the cylinder operating fluid through conduits 75 and 74 in the return flow direction, which the two small arrows designate. Transfer of molten metal from spout 21 into ladle L1 was discontinued when ladle K first started its return movement; and the fast return by holding ladle K quickens the speed of such metal cut off.

The just-described control facilities cause main holding ladle K to tilt upwardly at an initial "intermediate" speed of approach and then further to tilt at a "slow" speed while the metal is being poured and finally to return at a "fast" speed after a predetermined weight of the metal has been transferred into one of the holding ladles L.

Completion of the aforementioned return movement by ladle K is registered by limit switch LS1 which now closes. That closure activates the stepping solenoid 53 over a circuit which includes step switch arm 45 and contact 3, conductor 91, switch LS1 and conductor 92. Such energization advances all four switch arms 45 through 48 from position 3 to position 4.

In this Step 4 position of stepping switch SS, the first pouring ladle L1 has been filled with the requisite amount (assumed to be 30 pounds) of molten metal from ladle K; and the tare switch arm 48 once more activates tare mechanism 55 (in the strain gage circuit 33) with resultant return of WR pointer 35 to zero. This conditions instrument WR for an automatic weighing of the molten metal which soon is to be poured into the second pouring ladle L2.

In further preparation for such pouring into L2, the ladle car C now is shifted from its left position (represented) to its opposite or right position wherein the holding ladle spout 21 is aligned over said second pouring ladle L2. This second part of Step 4 is initiated by action switch arm 47 and contact 4 which energizes the left winding 94 of car valve CV over a circuit that includes conductors 95 and 96. Winding 94 now shifts valve CV to the left with resultant flow of pressure fluid from supply conduit 42 through conduit 97 and into the left end of car motor CM. Such pressure fluid now pushes the motor piston 98 back to the right causing piston rod 99 to pull ladle car C also to the right and brings spout 21 of holding ladle K over the second pouring ladle L2. In reaching this new position car C closes limit switch LS3.

Such closure energizes time delay relay TD2 over a circuit that extends from the first supply conductor 38 through conductor 57, step switch arm 45 and contact 4, conductor 102, switch LS3, conductor 103, the winding of relay TD2, and conductor 104 back to the second supply conductor 40. After a short time interval relay TD2 closes contact 101 to bridge stepping solenoid 53 across supply conductors 38 and 40 via a circuit which includes conductors 102 and 63. Solenoid 53 and ratchet 52 now advance all four stepping switch arms 45 through 48 from position 4 to position 5.

In this Step 5 position of stepping switch SS, action arm 47 now energizes the winding 68 of valve HV over a circuit which includes action contact 5 and the aforementioned conductors 70 and 71. This moves the valve pistons 90 to the right with resultant flow to tilting cylinder TM through conduit 74 of pressure fluid which moves the piston 25 of that cylinder in the right or tilting direction. There is thus imparted to holding ladle K the same initially intermediate-speed tilting movement as earlier was described in connection with Step 2; and such intermediate-speed tilting continues until ladle L2 first receives metal from spout 21.

The weight of such first received metal acting on strain gage 32 causes WR pointer 35 to move away from zero with an accompanying closure of contact 71. This contact closure causes solenoid 53 to close normally open valve 28 in motor supply conduit 74 with resultant throttling at valve 82 of the driving fluid that passes to cylinder TM. Result is the same slowing in ladle tilting speed as also was earlier described in connection with Step 2. The accompanying slow transfer of metal from ladle K into pouring ladle L2 continues until the latter ladle has received the required weight. Here again such weight is assumed to be the same 30 pounds as was earlier discussed in connection with pouring ladle L1; and when metal totaling that weight has been received by ladle L2 instrument WR registers such amount via pointer 35 and at the same time closes contact 86.

Such closure interconnects the earlier described conductors 87 and 88 to complete over step switch arm 45 and contact 5 an energizing circuit for stepping solenoid 53. Such completion causes ratchet 52 to advance all four stepping switch arms from position 5 to position 6.

In going to this Step 6 position of stepping switch SS, action switch arm 47 (in moving away from contact 5) de-energized winding 68 of solenoid valve HV. This permits spring 73 to return the valve to the left position with accompanying reversal of tilting cylinder TM and a return of holding ladle K to its untilted or level position. Such return proceeds at the same fast rate as was earlier described in connection with Step 3; and completion thereof is registered by the closing of limit switch LS1.

The two pouring ladles L1 and L2 both are now filled with accurately measured quantities of molten metal which thus is ready for pouring into molds M1 and M2. The aforementioned closing of limit switch LS1 activates stepping solenoid 53 over step switch arm 45 and contact 6 plus the conductors 91 and 92 earlier mentioned in connection with Step 4. This advances all four arms 45 through 48 of stepping switch SS to position 7, where that switch is kept until several operations incident to the pouring of ladles L1 and L2 into molds M1 and M2 have been accomplished.

In this Step 7 position of stepping switch SS, interlock arm 46 in engaging contact 7 interconnects conductors 105 and 106 and thereby sets up for the tilt winding 107 of pouring valve PV a circuit which now can be completed by depressing a "fill molds" push button 108. That circuit extends from first supply conductor 38 through conductor 109, push button 108, conductor 105, interlock arm 46 and contact 7, conductor 106, the valve winding 107, limit switch LS4 closed as shown when molds M1—M2 are in front of pouring ladles L1—L2, and conductor 110 back to the second supply conductor 40.

This energization of winding 107 shifts the pistons of valve PV to the right with resultant flow of pressure fluid through conduit 112 and into the upper portion of hydraulic cylinder PM. This imparts to the cylinder piston 113 a downward movement which through shaft 20 forwardly tilts ladles L1 and L2 with an accompanying pouring of their contents into the sprue openings S1 and S2 of molds M1 and M2. Upon reaching the position of maximum tilt a limit contact 115 on the piston rod 116 of motor PM completes an energizing circuit for time delay relay TD3. Such circuit includes conductors 109 and 117, the relay winding 118, limit contact 115 and conductor 119.

After a short interval sufficient to allow ladles L1 and L2 fully to empty their contents relay TD3 closes its contacts and thereby energizes the return winding 120 of valve PV by connecting it between conductors 117 and 119. Thus energized winding 120 returns valve PV to the represented left position in which pressure fluid from conduit 42 flows into the bottom of tilting cylinder PM and returns the now empty pouring ladles L1 and L2 to their upright position.

Molds M1 and M2 now are filled with measured quantities of molten metal and hence are ready for moving from the represented "Pair B" position immediately in front of ladles L1 and L2 to the "Pair A" position that is remote from these pouring ladles L1 and L2. Such movement may be accomplished either manually or by automatic mechanical means (not shown). It is accompanied by transfer of the LS4 contact from the lower to the upper position. Stick relay SR was de-energized and released when contact 115 was moved downwardly by cylinder PM during the pouring of ladles L1 and L2; and upward movement of contact LS4 (just mentioned as accompanying movement of molds M1—M2 away from ladles L1—L2) now re-energizes and picks up relay SR over a circuit that includes conductors 122 and 123.

Once so picked up by contact LS4 (in its uppermost position) relay SR bridges LS4 by its own stick contact 124 and thus continues energized after LS4 is again moved down (by a new pair of molds M1—M2). In this way contact 66 of SR along with contact 65 of pouring cylinder PM keeps conductors 64 and 67 interconnected after a pair of empty molds M has been moved from the "Pair C" position of Fig. 1B to the "Pair B" position immediately in front of pouring ladles L1—L2. Such bringing of empty molds in front of pouring ladles L1—L2 may be accomplished either manually or by automatic mechanical means (not shown) and restores limit switch LS4 to the downward position represented.

The automatic pouring and weighing system now is ready for another automatic cycle that is quite similar to the one already described as involving progression of stepping switch SS successively through Steps 1 to 7 inclusive. Such succeeding cycle involves further progression of switch SS through Steps 8 to 14 inclusive.

Advancement of switch SS to Step 8 can of course be initiated either automatically or under manual control. The illustrative organization here shown is arranged for the latter and utilizes a "start" push button 126. Depression of this push button 126 energizes stepping solenoid 53 over a circuit that includes conductors 109 and 88 and also contact 65 on ladle pouring motor PM along with contact 66 of stick relay SR. Both of the latter are closed to register an upright positioning of pouring ladles L1—L2 and the presence in front of those ladles of two empty molds M1—M2. Under those conditions stepping switch SS now advances all four of its arms 45 through 48 from position 7 to position 8.

In this Step 8 position of stepping switch SS, said upright ladles LL and L2 are both empty; and tare switch arm 48 now activates tare mechanism 55 causing weighing recorder WR to position its pointer 35 at zero. Step switch arm 45 completes over contact 8 an energizing circuit for time delay relay TD1; and after a short interval (during which device 55 completes its aforementioned taring function) that relay closes contact 60 to energize stepping solenoid 53 and thereby further advance switch SS to position 9.

In this Step 9 position of stepping switch SS, arm 47 energizes the winding 68 of valve HV and causes cylinder TM on car C to tilt the main holding ladle HL at a rate which is of intermediate speed. Car C and ladle K are aligned for pouring into ladle L2 and the metal first transferred into L2 advances WR pointer 35 away from zero. This closes valve 28 and reduces the speed of ladle K tilt to the slow rate. The actions here are the same as those earlier described in connection with Steps 2 and 5 and hence will not be repeated. Such slow pouring continues until the required quantity of metal has been transferred into ladle L2.

Such required transfer is registered by WR pointer 35 which closes contact 86 and advances stepping switch SS from position 9 to position 10. The stepping circuit here involved includes switch arm 45 and contact 9, conductors 79 and 87, WR contact 86 and conductor 88.

In going to this Step 10 position of stepping switch SS, action arm 47 (in moving away from contact 9) de-energized winding 68 of valve HV. This allows spring 73 to return that valve to the represented left position, thereby reversing the direction of tilting cylinder TM and causing it to return holding ladle K to the represented level position at the fast rate earlier described.

Full return of ladle K closes limit switch LS1 and completes for stepping solenoid 53 and energizing circuit which includes step switch arm 45 and contact 10, conductor 91, switch LS1 and conductors 92 and 63. Such circuit completion advances switch SS from position 10 to position 11.

In this Step 11 position of stepping switch SS, ladle L2 now is filled; and tare switch contact 48 again activates tare mechanism 55 with resultant return of WR pointer 35 to zero. At the same time action switch 47 completes over contact 11 an energizing circuit for the right winding 128 of car valve CV. Said circuit includes conductors 129 and 130.

Valve CV now shifts to the right with resultant flow of pressure fluid from conduit 42 through conduit 131 and into the right end of car motor CM. Hydraulic motor or cylinder CM traverses ladle car C to the left along rails 22 and back into the represented extreme left position where the pouring spout 21 of ladle K is aligned to deliver metal into pouring ladle L1. Completion of the car transfer movement closes limit switch LS2.

That closing of LS2 completes for time delay relay TD2 an energizing circuit which includes stepping switch arm 45 and contact 11, conductor 102, switch LS2, conductor 103, the winding of TD2 and conductor 104. After a short interval TD2 closes contact 101 and energizes stepping solenoid 53 by connecting conductor 102 with conductor 63. This advances all four arms 45 through 48 of stepping switch SS from position 11 to position 12.

In this Step 12 position of stepping switch SS, action arm 47 completes for winding 68 of valve HV an energizing circuit which includes action contact 12, conductor 70, the winding 68 and conductor 71. Valve HV now flows pressure fluid through conduit 74 into tilting cylinder TM and thereby causes that cylinder to tilt holding ladle K at an intermediate rate. Metal as received in ladle L1 from spout 21 moves WR pointer 35 away from zero to close contact 77 with resultant closing of valve 28 and an accompanying slowing of the tilt speed.

Such slow tilting of ladle K continues until pouring ladle L1 has received metal in required quantity. When this happens WR pointer 35 closes contact 86 and completes for stepping solenoid 53 an energizing circuit which includes step switch arm 45 and contact 12, conductors 79 and 87, the WR contact 86 and conductor 88. Stepping switch SS accordingly now advances from position 12 to position 13.

In going to this Step 13 position of stepping switch SS, action arm 47 in leaving contact 12 broke the circuit for valve HV winding 68. This allows spring 73 to return that valve to the represented left position. The accompanying reversal of tilting cylinder TM now returns holding ladle K to the represented normal position at the fast rate. Full ladle return again closes limit switch LS1.

Such LS1 closure activates stepping solenoid 53 over step switch arm 45 and contact 13 plus conductors 91 and 92. This advances stepping switch SS from position 13 to position 14, where switch SS remains until the measured contents of ladles L1 and L2 have been poured into empty molds M1 and M2 in front thereof.

In this Step 14 position of stepping switch SS, interlock arm 46 in now engaging contact 14 permits these pouring operations to be accomplished. Same are initiated by depressing the "fill molds" push button 108 with resultant energization of the tilt winding 107 of pouring valve PV. This causes motor PM to tilt ladles L1 and L2; and after a time delay set by relay TD3 those ladles are returned by valve PV and motor PM back to their represented upright position.

Molds M1 and M2 now in front of ladles L1 and L2 having received their measured quantities of molten metal are ready for movement away from the pouring ladles and replacement by a new set of empty molds. This is accomplished in exactly the same manner as already described for between earlier Steps 7 and 8 in the SS stepping switch cycle and hence the details will not again be repeated.

Following return of ladles L1—L2 to the upright position and replacement of the filled molds M1—M2 by a pair of empty molds, the system once more is ready for continuance of the automatic weighing and pouring cycle. Such continuance again is initiated by depressing "start" push button 126. This advances switch SS from position 14 to position 1. The apparatus now is in exactly the same condition as in the initial Step 1 position of stepping switch SS at which this operation description commenced. That is to say ladles L1 and L2 are both empty and upright; a pair of empty molds M1 and M2 has been positioned in front of those ladles, and the car C and holding ladle K are aligned for serving the first pouring ladle L1. The operations which take place from this Step 1 thus exactly duplicate those which already have been described.

It is to be observed that car C and ladle K remain in their position of last pouring from the time that the measured contents of pouring ladles L1 and L2 are transferred into molds M1—M2 to the time that a replacement set of empty molds is positioned in front of ladles L1—L2 for subsequent reception of measured metal from these ladles. In this way the traverse movements of car C and ladle K are reduced to one-half of what they would be if the automatic cycle of weighing and pouring were to start every time at the same selected pouring ladle L1 or L2. Stated in another way, a filling of ladles L1 and L2 in that order is followed by a filling of ladles L2 and L1 in that order, next by a filling of L1 and L2 in that order, then by a filling of L2 and L1 in that order and so on.

For the sake of improving clarity the just described diagram of Figs. 1A–1B has shown certain elements in a form which is either simplified or schematic. Thus, contacts 77 and 86 of the weighing instrument WR are represented as directly carrying the energizing current that at proper times is supplied to devices 78 and 53; whereas in an actual installation relays (not here shown) ordinarily will be interposed between those contacts and said controlled devices.

*Illustrative mechanical construction*

Our new metal weighing and pouring apparatus as just described by reference to the schematic showing of Fig. 1A–1B may utilize holding ladle and traversing car and pouring ladle apparatus of any suitable mechanical construction, one illustrative form of which is depicted by Figs. 2, 3 and 4.

There our two pouring ladles L1 and L2 are shown as being carried by a stationary member 133 that is in fixed communication with the concrete foundation (not shown) for the foundry building (not shown), whereby the two strain gages 31 and 32 respectively beneath those two ladles can (in conjunction with a third strain gage 30 shown only in Fig. 3) perform their intended weighing function in a reliable manner and without interference from vibrations of the foundry building. The effective attachment of these ladles L1 and L2 to their tilting shaft 20 is arranged near the top front ladle portions in any suitable way, such as Figs. 2—3—4 show; and this reduces shifting of the ladle spouts in going from the metal-receiving position (shown by full lines in Fig. 3) to the metal pouring or tilted position (shown dotted in Fig. 3).

Also in the Figs. 2—3—4 arrangement, the rotative movement necessary for tilting ladles L1—L2 are imparted to shaft 20 by a hydraulic motor PM' which is of the rotative type and which corresponds to and performs the functions of the conventional hydraulic cylinder that is represented at PM in Fig. 1B. This rotative hydraulic motor PM' may for example be constructed as shown and described by U.S. Patent 2,633,105 issued March 31, 1953 to J. A. Lasater for "Vane Type Fluid Motor."

Looking next at the holding ladle K, it in the organization of Figs. 2—3—4 is provided with a top cover 141 having an opening 142 through which molten metal from the cupola furnace (not shown) can be introduced from time to time; and the forward and upward tilting of this ladle K is at proper times imparted thereto by shaft 24, to which the ladle is fixedly attached at end points 134 in the manner shown.

Said tilting shaft 24 is carried by bearings 135 that derive their support from traversing car C; and tilting rotations are imparted to shaft 24 through the aforementioned hydraulic cylinder TM plus connecting rod 26 and shaft arm 27. Pressure fluid for operating cylinder TM is supplied thereto through the conduits 74 and 75 of Fig. 1B (not shown in Figs. 2-3), which conduits are flexible to allow for the traversing movements by car C along track rails 22. During such movements the car rolls on the four wheels shown at 143.

In this arrangement of Figs. 2—3—4 said traversing movements are imparted to car C by a hydraulic motor CM' which is of the rotary type and which corresponds to and performs the functions of the conventional hydraulic cylinder that is represented at CM in Fig. 1B. This motor CM may be constructed as shown by the aforementioned U.S. Patent 2,633,105 to Lasater; it is fixedly mounted in the manner shown beneath frame structure 137 along the top of which the ladle car C travels on rails 22; and it serves to rotate an arm 138 back and forth through the 180° arc that is shown dotted by Fig. 4.

Establishing communication between the end of said motor arm 138 and the ladle car C is a traversing rod 139 one of whose ends connects with said motor arm and the other of whose ends connects with a pin 140 projecting downwardly from the car bottom in the way indicated by Figs. 2 and 3. When motor arm 138 occupies the full line position of Figs. 2 and 4, ladle car C is at the extreme left with the spout 21 of ladle K positioned over the first pouring ladle L1; rotation by motor CM' of this arm through 180° to the dotted position of Fig. 4 now pulls car C to the extreme right position wherein said holding ladle spout 21 is in registry over the second pouring ladle L2; and reverse rotation by motor arm 138 through the same 180° arc causes connecting rod 139 to move car C back to the original position (shown by Figs. 2 and 4) wherein spout 21 is in registry with the first pouring ladle L1.

The organization of Figs. 2—3—4 further includes provision for swinging ladle car C and its supporting frame structure 137 away from pouring ladles L1 and L2 around a corner pivot pin that is shown at 145 in Figs. 2 and 4, which pin is carried by a mounting bracket 146 that is fixed to stationary foundation structure 147 in the way indicated by Fig. 2. Such engagement with corner pin 145 serves to support the right end of ladle car frame 137. The opposite or left end of the same frame 137 is supported by caster wheels shown at 148 in Figs. 2 and 3; and said car support frame 137 is held in the represented position close to pouring ladles L1 and L2 and their support member 133 by any suitable means such as the latch shown at 149 in Fig. 3.

Upon release of this latch 149 the entire holding ladle and car assemblage including frame 137 can be rolled on caster wheels 148 around said right pivot pin 145 (in the clockwise direction when viewing Fig. 4) away from pouring ladles L1 and L2, thereby making those ladles and their support member 133 (see Fig. 3) freely accessible for inspection and maintenance. Upon completion of such desired attention the entire assemblage including frame 137 can be returned to the represented operative position close to pouring ladles L1 and L2, and again secured therein by means of latch 149.

*Invention also useable with two-flask casting machine of the centrifugal type*

A second application of our automatic weighing and pouring facilities is represented by Figs. 5A and 5B wherein we have diagrammatically shown our new system as organized to effect an automatic weighing and pouring of molten metal into the two pouring spouts of a foundry machine that is designed to produce successive pairs of pipe lengths by centrifugally casting them in sand-lined mold flasks of the rotatable type. Such a machine is represented in simplified schematic form at the lower right of Fig. 5B; and it may be organized in the manner more fully shown and described by co-pending application Serial 427,842 filed May 5, 1954 in the names of J. A. Lasater and T. A. Deakins for "Centrifugal Casting Apparatus and Process" (Case 1911A).

In the simplified showing of Fig. 5B this centrifugal casting machine is mounted on a fixed frame or base 154 and utilizes two rotatable mold flasks 155 and 156 which are lined with sand at the beginning of each casting cycle. These are carried by a flask cradle 157 which at times holds those two rotatable mold flasks in the represented horizontal position and which at other times is shifted by a hydraulic motor 158 through 90° around side trunnions 159 (only one shown by Fig. 5B) to move the left ends of flasks 155—156 upwardly through a 90° arc and thereby bring those flasks into the vertical position.

This two-flask casting machine of Fig. 5B further utilizes the aforementioned pouring spouts 151 and 152 which are mounted on a carriage 161 that is movable by hydraulic cylinder 162 along side guide rods 163 (only one is shown) between the represented forward position wherein the delivery ends of these spouts 151 and 152 project into the ends of rotatable sand-lined mold flasks 155 and 156 and a rear position wherein those pouring spout ends have been withdrawn from said rotatable flasks 155 and 156.

This centrifugal casting machine of Fig. 5B in producing successive pairs of pipe lengths goes through an operating cycle which is more fully described by the aforesaid copending application Serial No. 427,842 of Lasater and Deakins. The sequential actions constituting such cycle may be initiated either by manual control means or by an automatic controller such as is diagrammatically indicated at 165 in Fig. 5B Certain of the actions that are involved by such pipe-producing cycle will now be described.

At the end of a cycle the mold flasks 155—156 are in a generally upright position and are open at top and bottom since the two lengths of pipe cast during that cycle have been discharged downwardly therefrom. With said flasks so upright or vertical the lower ends of both flasks are closed and sand in measured quantity now is introduced downwardly into the open top ends of these flasks.

Rotation of the two sand-charged mold flasks 155 and 156 is commenced (by means not here shown) and at the same time the flask cradle 147 is turned by device 158 until said flasks occupy the horizontal position represented. The rotation of these flasks 155—156 centrifuges the sand so that an opening is formed in and through each mold flask. The right-hand flask ends (formerly the bottom) now are uncovered to make way for an insertion of flask mandrels (not shown) which press against the interior of the rotating flask sand for the purpose of compressing and smoothing that sand into a finished mold of proper shape and diameter. Those mandrels next are withdrawn out of the right flask ends leaving this smooth lining of sand which forms the finished mold inside each of said two rotating flasks 155 and 156.

The two pouring spouts 151 and 152 now are advanced by cylinder 162 via their carriage 161 into the represented forward position wherein the delivering ends of those spouts are inserted into the open left ends of said rotating sand-lined mold flasks 155 and 156.

In it is this condition that the casting machine is ready to receive into spouts 151 and 152 measured quantities of molten metal from which two lengths of pipe are to be cast in the rotating sand molds of said flasks 155 and 156. In accordance with our invention such delivery is made by pouring ladles L1 and L2 in a manner presently to be described.

The molten metal thus delivered into spouts 151—152 is conveyed thereby into the interiors of the two sand-lined mold flasks 155—156 and by the rotation thereof is centrifuged therein to form lengths of pipe. Rotation of the flasks is continued until the molten metal has solidified sufficiently to retain its shape.

At this point the pouring spouts 151 and 152 are withdrawn to the left out of flasks 155 and 156, and those mold flasks now are turned by cradle 157 and device 158 to the upright or vertical position. The cycle is completed by a discharge (either by gravity or by positive mechanical means not shown) of the two cast lengths of pipe downwardly out of the lower ends of these now-vertical mold flasks 155 and 156. The lining sand also falls downwardly out of the flasks at the same time.

For an understanding of how our automatic weighing and pouring system coordinates with the two-flask casting machine which is shown in Fig. 5B and which has just been described, attention now will be directed to the complete diagram of Figs. 5A and 5B. As earlier indicated, said two figures when placed together in side-by-side relationship constitute a schematic representation of how our two pouring ladles L1 and L2 are organized to deliver accurately weighed charges of molten metal into the two aforementioned pouring spouts 151 and 152 of the illustrated casting machine.

It may here be pointed out that the Fig. 5A portion of this diagram is an exact reproduction of the earlier described Fig. 1A; also that Fig. 5B reproduces many of the elements and circuit organizations of Fig. 1B and differs from Fig. 1B only in substituting the two rotatable sand-lined mold flasks of the centrifugal casting machine for the static molds M1 and M2 of said earlier diagram.

In addition to the elements already described, said casting machine may if desired further be provided with a first limit switch 167 which closes when and only when cradle 157 occupies the represented position wherein the two rotating mold flasks 155—156 are horizontal; also with a second limit switch 168 which closes when and only when the pouring spouts 151 and 152 occupy the represented forward position wherein the metal-delivering ends thereof are inserted into the interiors of rotataing mold flasks 155 and 156.

*How system of Figs. 5A–5B operates*

The complete operating cycle of the Figs. 5A–5B system is fundamentally the same as the cycle earlier explained for the weighing and pouring system of Figs. 1A–1B; i.e., such cycle consists of fourteen steps which respectively are identified with the fourteen positions of stepping switch SS. This operation described for Figs. 5A–5B will begin with the assumption that the four switch arms 45—46—47—48 initially are in their represented first position 1 and that car C is at the left with holding ladle spout 21 aligned over pouring ladle L1. Such system operation is initiated by first closing the main power switch 37; and this action follows an earlier filling of a supply of molten metal into the main holding ladle K.

In this Step 1 position of the Fig. 5A stepping switch SS, the tare arm 48 activates tare mechanism 55 and thus causes WR pointer 35 to read zero with the two pouring ladles L1 and L2 of Fig. 5B both empty. Step arm 45 now energizes time delay relay TD1 over step contact 1 and conductor 58. After a short interval (during which mechanism 55 completes its taring), relay TD1 picks up contact 60 and thereby connects stepping solenoid 53 across supply conductors 38 and 40. The circuit here established includes the closed contact 65 at pouring ladles L1 and L2.

Stepping solenoid 53 now moves pawl 52 upwardly causing ratchet wheel 51 to advance all four switch arms 45 through 48 of device SS by one step to their respective contacts 2. In so advancing step arm 45 breaks the circuit for relay TD1 and thereby de-energizes stepping solenoid 53.

In this Step 2 position of stepping switch SS, action arm 47 initiates the tilting of holding ladle K. This is done by connecting valve HV winding 68 across supply conductors 38 and 40 over said action arm and contact 2 plus conductor 70. Valve HV, whose pistons 90 normally are held in the "tilt return" position by spring 73, now is shifted by winding 68 to the opposite or right position wherein pressure fluid from conduit 42 flows through conduit 74 into tilting cylinder TM.

Such fluid causes cylinder TM to tilt holding ladle K upwardly and forwardly around car shaft 24. As in the system of Figs. 1A–1B, the rate of such tilting initially is at an intermediate speed and so continues until metal first starts to pour from spout 21 into the pouring ladle L1 therebeneath. When that happens the resulting impulse from strain gage 31 moves pointer 35 of weighing recorder WR to the right from zero to close contact 77 and through device 78 to close normally open valve 28 and bypass the driving fluid for cylinder TM through throttling valve 82. This slows the rate of ladle K tilting.

When pouring ladle L1 has received molten metal in predetermined quantity (such as 30 pounds) the pointer 35 of weighing recorder WR so registers and closes contact 86 to complete for stepping solenoid 53 an energizing circuit which includes step switch arm 45 and contact 2 plus conductors 79, 87 and 88. Solenoid 53 and pawl 52 now move all four stepping switch arms 45 through 48 from their respective contacts 2 to their respective contacts 3.

In so moving to this Step 3 position the action arm 47 of stepping switch SS breaks the tilting circuit (including conductor 70) for the valve HV winding 68. This permits spring 73 to return the valve to the left with accompanying stoppage of tilting cylinder TM and a reversal of driving fluid therethrough. In consequence cylinder TM now moves its piston 25 in the opposite or return direction causing shaft arm 27 to lower holding ladle K to the level position indicated. As in Figs. 1A–1B, such return is at the fast rate throughout the entire range of ladle movement.

Completion of such return movement is registered by limit switch LS1 which now closes to activate stepping solenoid 53 over a circuit that includes step switch arm 45 and contact 3 plus conductors 91 and 92. Such energization advances all four switch arms 45 through 48 from position 3 to position 4.

In this Step 4 position of stepping switch SS, the first pouring ladle L1 has been filled with the requisite amount (assumed to be 30 pounds) of molten metal from ladle K; and the tare switch arm 48 again activates tare mechanism 55 with resultant return of WR pointer 35 to zero. This conditions instrument WR for an automatic weighing of the molten metal which soon is to be poured into the second pouring ladle L2.

In further preparation of such pouring into L2, the ladle car C now is shifted from its represented left position to its opposite or right position wherein the holding ladle spout 21 is aligned over said second pouring ladle L2. This second part of Step 4 is initiated by action switch arm 47 and contact 4 which energizes the left winding 94 of car valve CD over a circuit that includes conductors 95 and 96. Winding 94 now shifts valve CV to the left with resultant flow of pressure fluid through conduit 97 and into the left end of car motor CM. Such fluid flow acting on piston 98 causes device CM to pull ladle car C to the right and bring spout 21 of holding ladle K over the second pouring ladle L2.

In reaching this new position car C closes limit switch LS3 with resultant energization of time delay relay TD2 over step switch arm 45 and contact 4 plus the conductors 102 and 103. After a short interval TD2 closes contact 101 to energize stepping solenoid 53 which now advances all four stepping switch arms 45 through 48 from position 4 to position 5.

In this Step 5 position of stepping switch SS, action arm 47 energizes valve HV winding 68 over action contact 5 and conductors 70 and 71. This moves valve HV to the right with resultant flow to tilting cylinder TM through conduit 74 of pressure fluid which moves piston 26 in a forward or tilting direction. There thus is imparted to holding ladle K the same initially intermediate-speed tilting movement as earlier was described in connection with Step 2; and such tilting continues until ladle L2 first receives metal from spout 21, when such received metal acting through weighing device WR plus contact 77 and valve 28 again produces the same slowing in ladle tilting speed as was earlier described.

The resultant slow transfer of metal from ladle K into pouring ladle L2 continues until the latter has received the required quantity of metal (again assumed to be 30 pounds); and when such desired weight of metal has been received by ladle L2, pointer 35 of instrument WR closes contact 86 to complete over step switch arm 45 and contact 5 an energizing circuit for stepping solenoid 53 that produces an advance of all four stepping switch arms from position 5 to position 6.

In going to this Step 6 position of stepping switch SS, action switch arm 47 (in moving away from contact 5) de-energized winding 68 of solenoid valve HV. That valve now is returned to the left by spring 73 with accompanying reversal of tilting cylinder TM and a return of holding ladle K to its untilted or level position. Such return proceeds at the same fast rate as was earlier described in connection with Step 3; and completion thereof is registered by the closing of limit switch LS1.

The two pouring ladles L1 and L2 both are now filled with accurately measured quantities of molten metal which thus is ready for pouring into the two spouts 151 and 152 that deliver into the two sand-lined mold flasks 155—156 of the pipe casting machine shown in Fig. 5B. The aforementioned closing of limit switch LS1 activates stepping solenoid 53 over step switch arm 45 and contact 6 plus conductors 91 and 92. This advances all four arms 45 through 48 of stepping switch SS to position 7, where that switch is kept until several operations incident to the pouring of ladles L1 and L2 into machine spouts 151 and 152 have been accomplished.

In this Step 7 position of stepping switch SS, interlock arm 46 in engaging contact 7 interconnects conductors 105 and 106 and thereby sets up for the tilt winding 107 of pouring valve PV a circuit which now can be completed by closing the "fill molds" switch 108. This switch 108 may take the form of a manually actuated push button, or it may be arranged for automatic closure in response to movement either of selected elements of the casting machine of Fig. 5B or of selected devices within the controller 165 for that machine.

Such 108 closure, regardless of how initiated, energizes valve PV winding 107 over a circuit that extends from first supply conductor 38 through conductor 109, switch 108, conductor 105, interlock arm 46 and contact 7, conductor 106, the valve winding 107, closed limit switches 168 and 167 on the casting machine, and conductor 170 back to the second supply conductor 40. Inclusion in said circuit of the aforesaid limit switches 167 and 168 assures that the casting machine flasks 165—166 must be horizontal and that the pouring spouts 151—152 must be inserted into the ends of those sand-lined mold flasks before ladles L1 and L2 can be poured.

The aforementioned energization of winding 107 shifts valve PV to the right with resultant flow of pressure fluid through conduit 112 and into the upper portion of hydraulic cylinder PM. This moves cylinder piston 113 downwardly causing shaft 20 to tilt ladles L1 and L2 forwardly with an accompanying pouring of their contents into spouts 151 and 152 of the casting machine.

Upon reaching the position of maximum tilt a limit contact 115 on the piston rod 116 of cylinder PM completes for time delay relay TD3 an energizing circuit that includes conductors 109 and 117, the relay winding 118, limit contact 115 and conductor 119. After a short interval sufficient to allow ladles L1 and L2 to empty their contents into machine spouts 151 and 152, relay TD3 closes its contact and thereby energizes the return winding 120 of valve PV by connecting it between conductors 117 and 119. Winding 120 now returns valve PV to the represented left position in which pressure fluid from conduit 42 flows into the bottom of tilting cylinder PM and returns the now empty pouring ladles L1 and L2 to their upright position.

The measured quantities of metal so poured into machine spouts 151—152 have in the meantime been delivered by those spouts into the interiors of the rotating sand-lined mold flasks 155 and 156. After such transferred metal has solidified in those rotating flasks the casting machine continues with its previously described cycle of pipe-forming steps. The pouring spouts 151—152 now are withdrawn out of the flask ends (with accompanying opening of limit switch 168) and the flask cradle 157 is thereafter rotated through 90° around trunnions 159 to bring sand-lined flasks 155 and 156 with the solidified pipe lengths therein into the vertical position (with accompanying opening of limit switch 167). Said two lengths of pipe, together with the flask-lining sand, then are ejected downwardly out of these mold flasks 155 and 156 in the manner already described.

The casting machine thus is now ready to go through a succeeding cycle of action steps, the completion of which cycle will result in formation of two additional lengths of cast pipe. Such succeeding cycle will in due time progress to the point where the machine elements once more have the condition that is represented in Fig. 5B; i.e., rotating mold flasks 155—156 will once more be lined with fresh sand and pouring spouts 151—152 will again be advanced forwardly so that the spout ends have entered said two newly lined rotating flasks.

Meanwhile the automatic weighing and pouring system of our invention now is ready for another automatic cycle that is quite similar to the one already described as involving progression of stepping switch SS successively through Steps 1 to 7 inclusive. Such succeeding cycle involves further progression of switch SS through Steps 8 to 14 inclusive. At its start holding ladle car C remains in the position of last pouring (right) wherein spout 21 is aligned over the second pouring ladle L2.

Advancement of switch SS to Step 8 can of course be initiated under manual control (as was done in the earlier described system of Figs. 1A–1B) or such advancement can be initiated automatically either by the casting machine itself or by the controller 165 therefor. Any of these arrangements can utilize a "start" switch such as is shown at 126 in Fig. 5A. Closure of that switch 126 (whether manual or automatic) energizes stepping solenoid 53 over a circuit that includes conductors 109 and 88 plus contact 65 on ladle pouring motor PM. The latter is closed to register an upright position of pouring ladles L1 and L2. Under the condition just outlined stepping switch SS now advances all four of its arms 45 through 48 from position 7 to position 8.

In this Step 8 position of stepping switch SS, said upright ladles L1 and L2 are both empty; and tare switch arm 48 once more activates tare meachanism 55 causing weighing recorder WR to hold its pointer 35 at zero. Step switch arm 45 completes over contact 8 an energizing circuit for time delay relay TD1; and after a short interval that relay closes contact 60 to energize step solenoid 53 and thereby further advance switch SS to position 9.

In this Step 9 position of stepping switch SS, action arm 47 energizes valve HV winding 68 and causes cylinder TM on car C to tilt the main holding ladle K at a rate which initially is of intermediate speed. Car C and ladle K are aligned for pouring into ladle L2 and the metal first transferred into L2 advances WR pointer 35 away from zero with accompanying reduction in the speed of ladle K tilt to the slow rate. Such slow pouring continues until the required quantity of metal has been transferred into ladle L2.

This is registered by WR pointer 35 which closes contact 86 and advances stepping switch SS from position 9 to position 10. The step circuit for solenoid 53 here includes step switch arm 45 and contact 9 plus conductors 79, 87 and 88.

In going to this Step 10 position of stepping switch SS, action arm 47 (in moving away from contact 9) de-energized valve HV winding 68. Spring 73 now returns valve HV to the left position, thereby reversing tilting motor TM with accompanying fast-speed return of holding ladle K to the represented level position. Full return of ladle K closes limit switch LS1 and completes for stepping solenoid 53 an energizing circuit which includes step switch arm 45 and contact 10 and which advances switch SS from position 10 to position 11.

In this Step 11 position of stepping switch SS, ladle L2 now is filled; and tare switch contact 48 again activates tare mechanism 55 with resultant return of WR pointer 35 to zero. At the same time action switch arm 47 completes over contact 11 an energizing circuit for the right winding 128 of car valve CV, which circuit includes conductors 129 and 130.

Valve CV now shifts to the right with resultant flow of pressure fluid through conduit 131 into the right end of car motor CM and an accompanying movement of ladle car C to the left along rails 22 and back into the represented first position where the pouring spout 21 of ladle K is aligned to deliver metal into the now-empty pouring ladle L1. Completion of the car travel movement closes limit switch LS2.

That closing of limit switch LS2 completes for time delay relay TD2 an energizing circuit which includes step switch arm 45 and contact 11 plus conductors 102 and 103. After a short interval TD2 closes contact 101 and energizes stepping solenoid 53 over conductors 102 and 63. This advances all four switch arms 45 through 48 from position 11 to position 12.

In this Step 12 position of stepping switch SS, action arm 47 completes for valve HV winding 68 an energizing circuit which includes action contact 12 plus conductors 70 and 71. Valve HV now flows pressure fluid through conduit 74 into tilting cylinder TM with resultant tilting of holding ladle K at intermediate initial speed. Metal first received in ladle L1 from spout 21 moves WR pointer 35 away from zero to close contact 77 with resultant closing of valve 28 and an accompanying slowing of the tilt speed.

Such slow tilting of ladle K continues until pouring ladle L1 has received metal in required quantity (assumed to be 30 pounds). When this happens WR pointer 35 closes contact 86 to complete for stepping solenoid 53 an energizing circuit which includes step switch arm 45 and contact 12 plus conductors 79 and 88 and which advances stepping switch SS from position 12 to position 13.

In going to this Step 13 position of stepping switch SS, action arm 47 in leaving contact 12 broke the circuit for valve HV winding 68. Spring 73 now returns valve HV to the left with accompanying reversal of tilting cylinder TM which returns holding ladle K to the represented level position at fast rate.

Full ladle return again closes limit switch LS to activate stepping solenoid 53 over step switch arm 45 and contact 13 plus conductors 91 and 92. This advances stepping switch SS from position 13 to position 14, where the switch remains until the measured contents of ladles L1 and L2 have been poured into the two spouts 151 and 152 of the casting machine in front thereof.

In this Step 14 position of stepping switch SS, interlock arm 46 in now engaging contact 14 permits these pouring operations to be accomplished. Same are initiated by closing the "fill molds" switch 108 with resultant energization of valve PV winding 107. Such 108 switch closure can take place in exactly the same manner as already described for the earlier position 7 of stepping switch SS; and for this reason detailed explanation will not here be repeated.

Said energization of valve PV winding 107 causes motor PM to tilt ladles L1—L2; and after a time delay which is set by relay TD3 and during which the contents of those ladles are fully transferred into machine spouts 151 and 152, those ladles L1—L2 are returned by valve PV and motor PM back to their represented upright positions.

Said measured quantities of poured metal are transferred by spouts 151—152 into sand-lined mold flasks 155 and 156 of the casting machine. There rotation of the flasks centrifuges the metal into the desired lengths of cast pipe. Spouts 151—152 again are withdrawn from the flask ends, cradle 157 thereupon moves the flasks into the upright or vertical position, and the solidified lengths of cast pipe (together with the flask-lining sand) are thereupon ejected downwardly from the mold flasks.

This completion of another pipe-producing cycle by the casting machine conditions the machine for a start of a still succeeding cycle, the initial steps of which will duplicate those already described in detail. In consequence the machine once more returns to the condition represented in Fig. 5B wherein the two rotating mold flasks 155—156 (one more freshly lined with sand) are horizontal and the pouring spouts 151—152 have been moved forwardly along guide rods 163 to their represented positions with the spout ends inside said mold flasks 155—156.

At this point our automatic weighing and pouring system again is ready for continuance of its operation cycle. Such continuance again is initiated by closing "start" switch 126; and as previously pointed out such closure can be effected either manually or automatically.

Result thereof is to advance stepping switch SS from position 14 to position 1. The pouring and weighing apparatus now is in exactly the same condition as in the initial Step 1 position of stepping switch SS at which this operation description commenced. That is to say, ladles L1 and L2 are both empty and upright, the two sand-lined mold flasks 155 and 156 of the casting machine are in readiness to receive measured quantities of molten metal from ladles L1 and L2 via pouring spouts 151—152, and the car C plus holding ladle K are aligned for serving the first pouring ladle L1. The operations which take place from this Step 1 on thus exactly duplicate those which already have been described.

*Summary*

As in the system of Figs. 1A and 1B, car C and ladle K of Figs. 5A–5B remain in their position of last pouring from the time that the measured contents of pouring ladles L1 and L2 are transferred into machine spouts 151 and 152 to the time that the casting machine has fully completed its pipe-making cycle and has once more sand lined and otherwise conditioned the rotating mold flasks 155—156 for subsequent reception of weighed metal from those ladles. In this way the traverse movements of car C and ladle K are reduced to one-half of what they would be if the automatic cycle of weighing and pouring were to start every time at the same selected pouring ladle L1 and L2. Such reduction of cycling movements by car C lowers mechanical wear on the moving parts and thus minimizes maintenance.

Other benefits effected by our invention include a shortening of the time that is required to accomplish the weighing and pouring of molten metal, and also bettering the accuracy of the weighing. These result from our replacement of the human element by the here disclosed automatic facilities (including weighing recorder WR) which, when set for a given quantity of metal delivered into each of the pouring ladles L1 and L2, faithfully and with high accuracy hold that desired metal quantity within extremely close limits during cycle after cycle. For many casting operations such high accuracy of metal weighing is extremely vital and hence of great practical importance. Moreover, our automatic weighing and pouring facilities eliminate the lost motion which characterizes manual manipulation and they thus cut down the time that is needed to accomplish such weighing and pouring.

Likewise of practical significance is the accompanying reduction in the number of operators who are needed to weigh and pour molten metal into the molds of various foundry installations which can be served by our new automatic system. Two operators, for example, ordinarily are needed in order to pour molten metal from a master supply ladle such as of the overhead monorail type (not shown) either into the sprue openings S1 and S2 of the successive pairs of molds shown at M1 and M2 in Figs. 1A–1B or into the pouring spouts 151—152 of the two-flask casting machine that is shown in Figs. 5A–5B. Our new system eliminates both of those operators and also offers the supplemental advantages of performing the same functions in a better and quicker and otherwise more efficient way.

It thus is apparent that our invention achieves the broad object of bettering the performance of foundry installations wherein castings are formed via the employment of static or other molds into which molten iron or other metal is poured in measured quantities.

Our invention accordingly is comprehensive in its application and hence is not to be restricted to the specific form here disclosed by way of illustration.

What we claim is:

1. Foundry apparatus comprising a fixed support, first and second pouring ladles carried by said support in laterally spaced relation and disposed for simultaneous tilting so as to deliver into first and second empty molds when adjacent a given side of that support and otherwise in receiving relation with those ladles, a main holding ladle for containing a supply of molten metal and having a spout, a car carrying said holding ladle, means including rails adjacent the opposite side of said support for mounting said car so as to permit movement thereof back and forth along the rails between a first position wherein said holding ladle spout is over said first pouring ladle and a second position wherein said spout is over said second pouring ladle, mechanism on said car effective when activated in a forward sense to tilt said holding ladle and flow molten metal out of said spout into whichever of the two pouring ladles is therebeneath and further effective when activated in a reverse sense to return the holding ladle to its original untilted position, traversing mechanism for said holding ladle car effective when activated in one sense to move that car along said rails from said first position to said second position and further effective when activated in another sense to move that car from said second position to said first position, and frame means which extend beneath said car rails along the said opposite side of said fixed pouring ladle support and which are organized for swinging away from that fixed support when access to said support and to the said pouring ladles carried thereby is desired for purposes of inspection and maintenance.

2. In a system for weighing molten metal and pouring accurately predetermined quantities thereof into successive pairs of empty foundry molds, the combination of a pouring ladle support shaft, first and second pouring ladles carried by said shaft in laterally spaced and mechanically interconnected relation and disposed for simultaneous tilting so as to deliver into first and second empty molds when adjacent a given side of that shaft and otherwise in receiving relation with those ladles, a main holding ladle for containing a supply of molten metal and having a spout, a car carrying said holding ladle, means including rails adjacent the opposite side of said pouring ladle shaft for mounting said car so as to permit traversing movement thereof back and forth along the rails between a first position wherein said holding ladle spout is over said first pouring ladle and a second position wherein said spout is over said second pouring ladle, mechanism on said car effective when activated in a forward sense to tilt said holding ladle and flow molten metal out of said spout into whichever of the two pouring ladles is therebeneath and further effective when activated in a reverse sense to return the holding ladle to its original untilted position, forward control means for the said tilting mechanism on said holding ladle car organized to activate that mechanism in its said forward sense when that car occupies its said first position at a time when said first pouring ladle is both empty and upright and also when that car occupies its said second position at a time when said second pouring ladle is both empty and upright, weighing means effective to indicate when the particular pouring ladle being filled has received from said holding ladle a predetermined weight of molten metal as desired for delivery into one of the aforesaid empty molds, return control means for the said tilting mechanism on said holding ladle car governed by the aforesaid weight indication and organized to activate that mechanism in its said reverse sense and return the holding ladle to its untilted position in response to each such indication that metal in said desired quantity has been received from said holding ladle by one of the two pouring ladles, traversing mechanism for said holding ladle car activated by said holding ladle return at the end of a particular pouring ladle fill if that fill has constituted the second consecutive pouring into the same ladle while the car has stayed at rest in continuous registry with that ladle and further if the other pouring ladle still is empty with that mechanism then being operative to traverse the holding ladle car to the other position for subsequent filling of similarly weighed metal into said other pouring ladle at that other position, and devices which are operative after said first and second pouring ladles both have been filled in the way described and which thereupon cause said ladle support shaft simultaneously to tilt those two so filled pouring ladles with resultant transfer of their weighed charges of molten metal into the aforementioned empty first and second molds and then to reposition both ladles upright.

3. A weighing and pouring system organized as defined by claim 2 and additionally including further control means responsive to the said upright repositioning of the two pouring ladles and to the presence of another pair of empty molds in receiving relation with said two pouring ladles for initially keeping said holding ladle car in its position of last pouring and then restarting the sequence of actions described by claim 10 with resultant refilling of the empty pouring ladle at said last position followed by traversing of the car to its other position and filling of the other empty pouring ladle thereat.

4. A weighing and pouring system organized as defined by claim 2 and including master governing facilities organized to coordinate the various control means recited in claim 10 and to activate them in such sequence that starting with both pouring ladles empty and the holding ladle car positioned in register with either one of those pouring ladles said desired predetermined weight of molten metal from the holding ladle first will be filled into that one pouring ladle, said car next will be traversed to the opposite position where the holding ladle spout is in register with the other pouring ladle, and molten metal also in said desired predetermined weight then will be filled from the holding ladle into said other pouring ladle.

(References on following page)

References Cited in the file of this patent

UNITED STATES PATENTS

| | | |
|---|---|---|
| 1,747,728 | Morris | Feb. 18, 1930 |
| 2,015,776 | Barr et al. | Oct. 1, 1935 |
| 2,522,031 | Gavin, Sr. | Sept. 12, 1950 |
| 2,792,602 | Rossi | May 21, 1957 |

OTHER REFERENCES

The Iron Age, Dec. 5, 1946, pages 77–80 relied on. (Copy in Scientific Library.)

UNITED STATES PATENT OFFICE
CERTIFICATION OF CORRECTION

Patent No. 2,922,205                            January 26, 1960

Thomas A. Deakins et al.

It is hereby certified that error appears in the above numbered patent requiring correction and that the said Letters Patent should read as corrected below.

Column 20, lines 56 and 63, for the claim reference numeral "10", each occurrence, read -- 2 --.

Signed and sealed this 8th day of August 1961.

(SEAL)
Attest:

ERNEST W. SWIDER
Attesting Officer

DAVID L. LADD
Commissioner of Patents